US009883457B2

(12) United States Patent
Zimmerman (10) Patent No.: US 9,883,457 B2
(45) Date of Patent: *Jan. 30, 2018

(54) METHOD AND APPARATUS FOR REDUCING POWER CONSUMPTION OF A COMMUNICATIONS DEVICE DURING PERIODS IN WHICH THE COMMUNICATIONS DEVICE RECEIVES IDLE FRAMES FROM ANOTHER COMMUNICATIONS DEVICE

(71) Applicant: Marvell International Ltd., Hamilton (BM)

(72) Inventor: George A. Zimmerman, Rolling Hills Estates, CA (US)

(73) Assignee: Marvell International Ltd., Hamilton (BM)

( * ) Notice: Subject to any disclaimer, the term of this patent is extended or adjusted under 35 U.S.C. 154(b) by 219 days.

This patent is subject to a terminal disclaimer.

(21) Appl. No.: 14/659,570

(22) Filed: Mar. 16, 2015

(65) Prior Publication Data

US 2015/0195784 A1 Jul. 9, 2015

Related U.S. Application Data

(63) Continuation of application No. 12/291,725, filed on Nov. 12, 2008, now Pat. No. 8,984,304.

(Continued)

(51) Int. Cl.
*H04W 52/02* (2009.01)
*G06F 1/32* (2006.01)
*H04W 72/04* (2009.01)

(52) U.S. Cl.
CPC ...... *H04W 52/0225* (2013.01); *G06F 1/3203* (2013.01); *G06F 1/325* (2013.01);
(Continued)

(58) Field of Classification Search
None
See application file for complete search history.

(56) References Cited

U.S. PATENT DOCUMENTS 4,359,778 A 11/1982 Lee
4,583,235 A 4/1986 Domer et al.
(Continued)

FOREIGN PATENT DOCUMENTS

| CN | 1214823 A | 4/1999 |
|---|---|---|
| CN | 1988698 A | 6/2007 |
| WO | 0228019 A2 | 4/2002 |

OTHER PUBLICATIONS

Oscar Agazzi, et al., "IOGb/s PMD Using PAM-5 Trellis Coded Modulation", Broadcom, IEEE 802.3, Albuquerque, New Mexico, Mar. 6-10, 2000, 38 pages.

(Continued)

*Primary Examiner* — Paul J Yen (57) ABSTRACT

A first transceiver operable to establish a connection with a second transceiver over a channel. A receiver of the first transceiver maintains communication parameters for the connection with the second transceiver, and processes signals received over the channel according to the communication parameters. The receiver monitors for idle frames from the second transceiver, and begins running of a first idle period in response to detecting a predetermined number of consecutive idle frames. The receiver, during the first idle period, suspends adaptation of the communication parameters. At an end of the first idle period, the receiver receives a first frame from the second transceiver, selectively adapts the communication parameters based on the first frame, and selectively begins running of a second idle period. A transmitter of the first transceiver suspends transmitting frames to the second transceiver during the first idle period and the second idle period.

19 Claims, 5 Drawing Sheets

Related U.S. Application Data (60) Provisional application No. 60/987,327, filed on Nov. 12, 2007.

(52) U.S. Cl.
CPC ............. *H04W 72/04* (2013.01); *Y02B 60/32* (2013.01); *Y02B 60/50* (2013.01)

(56) References Cited

U.S. PATENT DOCUMENTS

| | | | |
|---|---|---|---|
| 4,878,232 | A | 10/1989 | Fisher |
| 4,956,838 | A | 9/1990 | Gilloire et al. |
| 5,150,381 | A | 9/1992 | Forney, Jr. et al. |
| 5,222,084 | A | 6/1993 | Takahashi |
| 5,249,200 | A | 9/1993 | Chen et al. |
| 5,293,402 | A | 3/1994 | Crespo et al. |
| 5,297,170 | A | 3/1994 | Eyuboglu et al. |
| 5,301,209 | A | 4/1994 | Wei |
| 5,305,307 | A | 4/1994 | Chu |
| 5,307,405 | A | 4/1994 | Sih |
| 5,388,124 | A | 2/1995 | Laroia et al. |
| 5,633,863 | A | 5/1997 | Gysel et al. |
| 5,646,958 | A | 7/1997 | Tsujimoto |
| 5,790,057 | A * | 8/1998 | Linde .................. H04L 1/0057 341/68 |
| 5,822,371 | A | 10/1998 | Goldstein et al. |
| 5,856,970 | A | 1/1999 | Gee et al. |
| 5,862,179 | A | 1/1999 | Goldstein et al. |
| 5,896,452 | A | 4/1999 | Yip et al. |
| 5,909,466 | A | 6/1999 | Labat et al. |
| 6,081,502 | A | 6/2000 | Paneth et al. |
| 6,088,827 | A | 7/2000 | Rao |
| 6,147,979 | A | 11/2000 | Michel et al. |
| 6,160,790 | A | 12/2000 | Bremer |
| 6,167,082 | A | 12/2000 | Ling et al. |
| 6,201,831 | B1 | 3/2001 | Agazzi et al. |
| 6,226,332 | B1 | 5/2001 | Agazzi et al. |
| 6,249,544 | B1 | 6/2001 | Azazzi et al. |
| 6,252,904 | B1 | 6/2001 | Agazzi et al. |
| 6,253,345 | B1 | 6/2001 | Agazzi et al. |
| 6,259,729 | B1 | 7/2001 | Seki |
| 6,272,173 | B1 | 8/2001 | Hatamian |
| 6,285,653 | B1 | 9/2001 | Koeman et al. |
| 6,297,647 | B2 | 10/2001 | Kirk et al. |
| 6,304,598 | B1 | 10/2001 | Agazzi et al. |
| 6,351,531 | B1 | 2/2002 | Tahernezhaadi et al. |
| 6,356,555 | B1 | 3/2002 | Rakib et al. |
| 6,433,558 | B1 | 8/2002 | Sciacero et al. |
| 6,463,041 | B1 | 10/2002 | Agazzi |
| 6,463,542 | B1 | 10/2002 | Yu et al. |
| 6,480,532 | B1 | 11/2002 | Vareljian |
| 6,493,448 | B1 | 12/2002 | Mann et al. |
| 6,584,160 | B1 | 6/2003 | Amrany et al. |
| 6,598,203 | B1 | 7/2003 | Tang |
| 6,618,480 | B1 | 9/2003 | Polley et al. |
| 6,665,402 | B1 | 12/2003 | Yue et al. |
| 6,751,255 | B1 | 6/2004 | Reuven et al. |
| 6,813,311 | B1 | 11/2004 | Pal et al. |
| 6,823,483 | B1 | 11/2004 | Creigh |
| 6,826,226 | B1 | 11/2004 | Sahlin et al. |
| 6,862,326 | B1 | 3/2005 | Eran et al. |
| 6,961,373 | B2 | 11/2005 | Jones |
| 7,065,167 | B2 | 6/2006 | McClellan |
| 7,573,867 | B1 | 8/2009 | Welch |
| 7,856,028 | B2 * | 12/2010 | Yousefi .................. H04L 12/12 340/693.1 |
| 7,920,597 | B2 | 4/2011 | Conway et al. |
| 2001/0036160 | A1 | 11/2001 | Curran et al. |
| 2002/0067824 | A1 | 6/2002 | Wang |
| 2002/0106016 | A1 | 8/2002 | Egelmeers et al. |
| 2002/0176492 | A1 | 11/2002 | Zangi et al. |
| 2002/0191552 | A1 | 12/2002 | Watkinson |
| 2003/0067888 | A1 | 4/2003 | Bina et al. |
| 2003/0108092 | A1 | 6/2003 | Gorecki et al. |
| 2003/0142659 | A1 | 7/2003 | Lin et al. |
| 2003/0206564 | A1 | 11/2003 | Mills et al. |
| 2003/0223481 | A1 * | 12/2003 | Jones .................. H04L 1/24 375/222 |
| 2004/0001540 | A1 | 1/2004 | Jones |
| 2004/0022311 | A1 | 2/2004 | Zerbe et al. |
| 2004/0090981 | A1 * | 5/2004 | Lin .................. H04L 25/03146 370/445 |
| 2004/0125487 | A9 | 7/2004 | Sternad et al. |
| 2005/0105545 | A1 | 5/2005 | Thousand et al. |
| 2006/0069769 | A1 * | 3/2006 | Dacosta ............ H04L 29/06027 709/224 |
| 2006/0153238 | A1 | 7/2006 | Bar-On et al. |
| 2006/0179301 | A1 | 8/2006 | Mori |
| 2009/0003229 | A1 * | 1/2009 | Loh .................... H04L 41/0833 370/252 |
| 2009/0119524 | A1 | 5/2009 | Hays |

OTHER PUBLICATIONS

Jamie E. Kardontchik, 4D Encodingin Level-One's Proposal for IOOOBAS-T', Advanced Micro Devices, Aug. 21, 1997—Rev. B, pp. 1-24.

Erich F. Haratsch, et al., "A 1-Gb/s Joint Equalizer and Trellis Decoder for IOOOBASE-T Gigabit Ethernet", IEEE Journal of Solid-State Circuits, vol. 36, No. 3, Mar. 2001, pp. 374-384.

Gottfried Ungerboeck, "Trellis-Coded Modulation with Redundant Signal Sets", IEEE Communications Magazine, Feb. 1987, vol. 25, No. 2, pp. 5-21.

'Wirescope 350- Understanding ELFEXT', © 2000 Agilent Technologies, 2 pages.

M.P. Sellers, et al., "Stabilized Precoder for Indoor Radio Communications", IEEE Communications Leuers, vol. 4, No. 10, Oct. 2000, pp. 315-317.

David Crawford, "Adaptive Filters", © David Crawford 1996, pp. 1-5.

David A. Johns, et al., "Integrated Circuits for Data Transmission Over Twisted-Pair Channels", IEEE Journal of Solid-State Circuits, vol. 32, No. 3, Mar. 1997, pp. 398-406.

Prof. David Johns, University of Toronto, "Equalization", © D.A. Johns 1997, 29 pages.

Richard D. Wesel, et al. "Achievable Rates for Tomlinson-Harashima Precoding", IEEE Transactions on Information Theory, vol. 44, No. 2, Mar. 1998, pp. 824-831.

Shao-Po Wu, et al., "FIR Filter Design via Spectral Factorization and Convex Optimization", to appear as Chapter I of Applied Computational Control, Si:<nal and Communications, Biswa Datta Editor, Birkhausesr, 1977, pp. 1-33.

Lowegian's dspGuru FIR FAQ Part 2: Properties, © 1999-2000 lowegian International Corp., pp. 1-4.

Chip Fleming, "A Tutorial on Convolutional Coding with Viterbi Decoding", © 1999-2002, Spectrum Applications, pp. 1-6. 'Elfext-Introduction', Fluke NetworksT™, © 2000, pp. 1-2.

28.5 Protocol Implementation Conformance Statement (PICS) Proforma for Clause 28, Physical Layer Link Signaling for I O Mb/s, I000 Mb/s and 1000 Mb/s Auto-Negotiation on Twisted Pair, IEEE Sui. 802.3, 1998 Edition, pp. 6-14 and 18-44.

M. Tomlinson, "New Automatic Equalizer Employing Modulo Arithmetic", Electronic Lellers, vol. 7, 1971, pp. 138-139.

H. Harashima and M. Miyakawa, "Matched-Transmission Technique for Channels with IntersymbolInterference", IEEE Transactions on Communications, vol. COM-20, No. 4, Aug. 1972, pp. 774-780.

P. Kabal and S. Pasupathy, "Partial-Response Signaling", IEEE Transactions on Communications, vol. COM-23, No. 9, Sep. 1975, pp. 921-934.

R.F.H. Fischer, W.H. Gerstacker, and J.B. Huber, "Dynamics Limited Precoding, Shaping, and Blind Equalization for Fast Digital Transmission Over Twisted Pair Lines", IEEE Journal on Selected Areas in Communications, vol. 13, No. 9, Dec. 1995, pp. 1622-1633.

(56) References Cited

OTHER PUBLICATIONS

R.F.H. Fischer and J.B. Huber, "Comparison of Precoding Schemes for Digital Subscriber Lines", IEEE Transactions on Communictions, vol. 45, No. 3, Mar. 1997, pp. 334-343.
'Producing a Counter EMF', http://www.tpub.com/neets/book2/5e.htm 3 pages (date unknown).
Li, M.; Wang, S., T. Tao, T. Kawasniewski, "FIR Filter Optimization as Pre-emphasis of High Speed Backplane Data Transmission", Electronic IT Letters, Jul. 8, 2004, vol. 40, No. 14, 2 pages.
Transformer Polarity, Copyright 2002 Kilowatt Classroom, II C, 4 pages (date unknown).
Application Note- Design of H.F. Wideband Power Transformers; Part 11-EC07213, Philips Semiconductors, Mar. 23, 1998, pp. 1-10
Technical Information—Use of Ferrites in Broadband Transformers, Fair-Rite Products, Corp., 14th Edition, pp. 170-173 (date unknown).
Huiting Chen, et al., "Current Mirror Circuit with Accurate Mirror Gain for Low P Transistors", supported in part by Dallas Semiconductor Corp., 4pages (date unknown).
A.Herkersdorf, et al., "A Scalable SDH/SONET Framer Architecture for DATACOM and TELCO Applications", fIiM Research, Zurich Research Laboratory, Switzerland, 8 pages (date Unknown).
Christopher T. DiMinico of Cable Design Technologies (CDT) Corporation, Massachusetts and Paul Kish ofNORDX/CDT, Montreal, Canada.
Development of Equal Level Far-End Crosstalk (ELFEXT) and Return Loss Specifications for Gigabit Ethernet Operation on Category 5 Copper Cabling, 10 pages (date unknown).
Pedro Silva, et al., "Precoder Circuit for Channels with Multipath Dispersion", Telecommunications Institute, Department of Electronics and Telecommunications Engineering, The University of Aveiro—University Campus, Portugal, 4 pages (date unknown).
Tutorial: Adaptive Filter, Acoustic Echo Canceller and its Low Power Implementation, © of Freehand Communication A B, 6 pages (date unknown).
Shao-Po Wu, et al., "Fir Filter Design via Semidefinite Programming and Spectral Factorization", Information Systems Laboratory, Stanford University, CA, 6pages (date unknown).

J. Jezek, Institute of Information Theory and Automation, Prague, Czec Republic, et al., "New Algorithm for Spectral Factorization and its Practical Application", pp. 1-6 (date unknown).
ADSL Tutorial, http://www.dslforum.org/aboutdsl/ads 1 tutorial.html, pp. 1-3 (date unknown).
Introduction to DSP, http://www.bores.com/courses/intro/filters/4 fir.htm, pp. 1-2 (date unknown).
QAM VR-QAM Demodulator with Variable Rate, DesignObjects™ by sci-worx, pp. 1-2 (date unknown).
Description of Algorithms (Part I), http://pwl.netcom.com/[Jchip.f/viterbi/algrthms.html. pp. 1-7 (date unknown).
Continuous Time Aperiodic Signals: the Fourier Transform, http://ece.ucsd.edu/Jcruz/ece.l 0 I /notes/nodes32.html. pp. 1-2 (date unknown).
Convolution, htto:I/www.wam.umd.edu/Utoh/spectrum/Convolution.html, pp. 1-2 (date unknown).
Convolution by DIT, htto://www.gresilo~r.com/en!!lish/excommend/doc/convtd.htm pp. 1-3 (date unknown).
Mehdi Hatamian, et al., "Design Considerations for Gigabit Ethernet I OOOBase-T Twisted Pair Transceivers", IEEE 1998 Custom Integrated Circuits Conference, pp. 335-342.
Gigabit Ethernet Over Category 5, Copyright 2000-2001 Agilent Technologies, 12 pages.
David Smalley, "Equalization Concepts: A Tutorial", Atlanta Regional Technology Center Texas Instruments, Oct. 1994, pp. 1-29.
Wolfgang H. Gerstacker, et al., "Blind Equalization Techniques for xDSL Using Channel Coding and Preceding", submitted to AEO Int. J. Electr. Commun., May 1999, pp. 1-4.
Definition of Minimum Phase, www-ccrma.stanford.edu/-jos/filters/Definition Minimum Phase.html, 3 pages.
Electric Machinery: Chap. 2 Transformers—Dot Convention to Denote the Polarity of a Transformer, Ihttp://pemclab.cn.netu.edu.tw/W3elemac/W3slide/ch2.xformers/s1d009.htm, 4 pages (date unknown).
Fast Fourier Transform, http://cas.ensmp. fr/D chaplais/Wavetour_presentation/transformees/Fourier/FFTUS.html, pp. 1-2 (date unknown).
Extended European Search Report for related European Application No. 08849192.3; dated Jun. 2013; 5 pages.
First Office Action for related Chinese Application No. 200880120603.8; dated Jul. 2012; 2 pages.

* cited by examiner

METHOD AND APPARATUS FOR REDUCING POWER CONSUMPTION OF A COMMUNICATIONS DEVICE DURING PERIODS IN WHICH THE COMMUNICATIONS DEVICE RECEIVES IDLE FRAMES FROM ANOTHER COMMUNICATIONS DEVICE

PRIORITY CLAIM

This application is a continuation of U.S. patent application Ser. No. 12/291,725 (now U.S. Pat. No. 8,984,304), filed on Nov. 12, 2008, which claims the benefit of U.S. Provisional Patent Application No. 60/987,327, filed on Nov. 12, 2007. The entire disclosures of the applications referenced above are incorporated herein by reference.

FIELD OF THE INVENTION

The invention relates to data communication and in particular to a method and apparatus for entering a power saving idle state in data communication systems.

RELATED ART

Numerous prior art communications systems, such as current 10 G-BaseT systems enable communication at high rates of speed over substantial distances. Solarflare Communications, located in Irvine, Calif. is the leading design and product development entity for 10 Gigabit Ethernet communication systems. While such communication systems operate as specified and desired, there is a global desire to reduce power consumption, such as electric power consumption, without degrading performance.

In prior art Ethernet systems, such as 10 Gigabit systems, the communication system is always active, such that either data or idle frames are always transmitted, received, and processed by the receiver. The idle frames may comprise scrambled sequences of 1 and 0 bits which are arranged into special codes that indicate that the frames are idle frames, and not data. Active operation of the transmitter, receiver, and receiver processing elements consumes substantial power and as such, is the primary source of power consumption in a communication system.

As can be appreciated, during periods when a 10 Gbit/second communication system is not exchanging data, idle frames are still being generated, transmitted, received and processed at 10 Gbit/second rate. This consumes substantial power even when data is not being exchanged.

One proposed solution is to reduce the transmit rate to reduce power consumption. For example, in a 10 GBase-T system, it has been proposed to reduce the rate during idle states to save power. The amount of power saved is proportional to the reduction in rate. This proposed solution suffers from several drawbacks. One such drawback is that power savings are less than the solution proposed herein. Another drawback is that to reactivate communication at the full data rate, significant reconfiguration to the settings of the communication system must occur which requires an undesirably long delay. This delay, referred to as the transition time or transition latency, degrades performance and hinders the user's and network's ability to rapidly exchange data.

As a result, there is a need in the art for a method and apparatus to reduce power consumption of a communication system while concurrently minimally affecting performance.

SUMMARY

To overcome the drawbacks of the prior art and to provide additional benefits, a method and apparatus is disclosed for monitoring idle periods and entering the communication system into a power down state. During the power down state, periodic communication and signal processing occurs to maintain the transceiver's communications settings, such as synchronization and equalizer coefficients. Re-activation occurs in response to active data or a reactivation request.

In one embodiment, the innovation comprises a method for reducing power consumption in an Ethernet communication device. This exemplary method comprises monitoring for an idle frame and upon detecting a predetermined number of idle frames, entering a reduce power consumption state in which idle frames are not processed. Then, monitoring for a transmit period and responsive to a transmit period, receiving one or more idle or training frames. This method optionally adapts the communication system based on one or more of the one or more idle or training frames. After optional adaptation, the system may re-enter a reduced power consumption state in which idle frames are not processed.

In one embodiment, the predetermined number of idle frames comprises one idle frame. In addition, the step of monitoring for a transmit period comprises receiving a timer output such that the timer output signals the transmit period. It is also contemplated that optionally adapting may comprise analyzing the idle or training system to determine channel conditions and then comparing the channel conditions with prior channel conditions. Based on this, the method then adapts the communication system if the comparing reveals a change in channel conditions greater than a threshold. This method may receive and detect an activate frame and, responsive thereto, restore data communication.

Also disclosed herein is a method for maintaining a communication link during periods of non-use of the communication system comprising detecting an idle period in a communication system. Then, responsive to the idle period, initiating a counter or timer for a first time period, as part of an idle frame sequence, and sending idle frames during the idle frame sequence. Then, monitoring for an end of the first time period and responsive to the end of the first time period, stopping the sending of idle frames. This method then initiates a counter or timer to start a second time period and monitors for the end of the second time period and responsive to the end of the second time period sending a sync or idle frame to an opposing receiver. Then the method receives and processes the sync or idle frame at the opposing receiver to maintain one or more settings of the opposing receiver.

In one embodiment, the counter or timer times a predetermined period of time. For example the counter or timer may count or track frames. In addition, stopping the sending of idle frames may comprise sending no signal. In addition, maintaining one or more settings of the opposing receiver may comprise performing timing synchronization, adaptation, or both. In addition, the step of stopping the sending of idle frames further may comprise powering down one or more aspects of a transmitter.

Also disclosed herein is a system for saving power in a communication device comprising an input/output port configured to connect to one or more channels and a transmitter configured to transmit data over the channel via the input/output port. Also part of this embodiment is a controller configured to interface with the transmitter. The controller may be configured to detect idle periods, control the transmitter to initiate a silent period by no longer sending a signal over the channel after a predetermined idle period, and reactivate the transmitter periodically to send sync or idle information, and reactivate the transmitter in response to active data to be transmitted. The sync or idle information to be used by an opposing receiver to maintain the opposing receiver settings.

In one embodiment the system further comprises a detector, the detector configured to detect incoming or outgoing signals. It is further contemplated that the system further comprises a timer configured to time idle periods. The memory may be configured to store information regarding the length of a predetermined idle period. In addition, the system may further comprise a clocking system having a clock signal, and during a silent period the clock signal it not provided to two or more transmitter apparatus. In one embodiment during the silent period, the controller turns off one or more aspects of the transmitter and one or more aspects of the opposing receiver are also turned off.

BRIEF DESCRIPTION OF DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
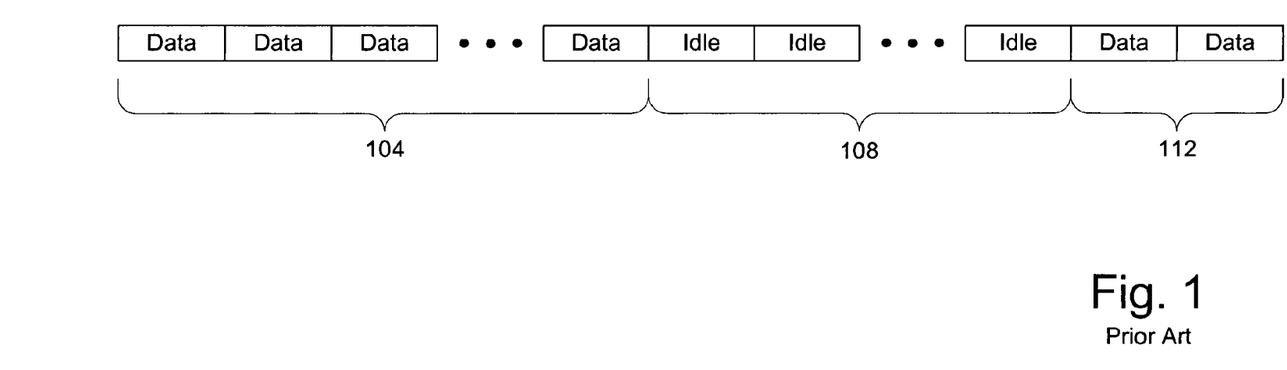
FIG. 1 illustrates a prior art frame stream.

FIG. 1 illustrates a prior art frame stream. In this prior art frame stream, during periods when data is not transmitted, idle frames are transmitted to maintain the communication device synchronization and equalizers. Data is defined herein as user information which is transmitted between communication devices for higher level application levels. Idle frames are digital content sent during periods when data is not sent, such as when the communication device is not in use by a user.

During a frame sequence 104 a user or the communication device is utilizing the communication channel for the exchange of data. As such, data is being transmitted and received by opposing transceivers, and the communication system is functioning as desired to perform data communication. Thereafter, during a frame sequence 108, the communication devices stop transmitting data and become idle. During idle periods, idle frames, containing scrambled 1's and 0's are transmitted between stations and processed. The idle frames do not contain user data and as such, are transmitted to maintain the communication link. Maintaining the communication link may include maintaining timing, maintaining equalizer adaptation, maintaining echo and crosstalk canceler adaptation, as well as physical link security keeping the system informed that the far-end device is present and still connected by physical cabling. As a drawback, transmitting and processing idle frames during inactive periods undesirably maintains power consumption at the transmitter and receiver. As can be appreciated, transmitting idle frames during periods of non-use is wasteful. Some network connected computers may be left on all night and consume power the entire night. Power consumption also leads to heat generation and additional cooling requirements. Upon a user or other machine restoring active communication, data frames are transmitted again at frame sequence 112.

To overcome the drawbacks of the prior art and to provide additional advantages, a method and apparatus is disclosed herein to reduce power consumption in communication systems by entering a reduced power mode (state) during idle periods. Idle periods may be any time when data is not transmitted, received, or both, or when the rate of data transfer is sufficiently low to allow for a reduced power mode.

Figure 2:
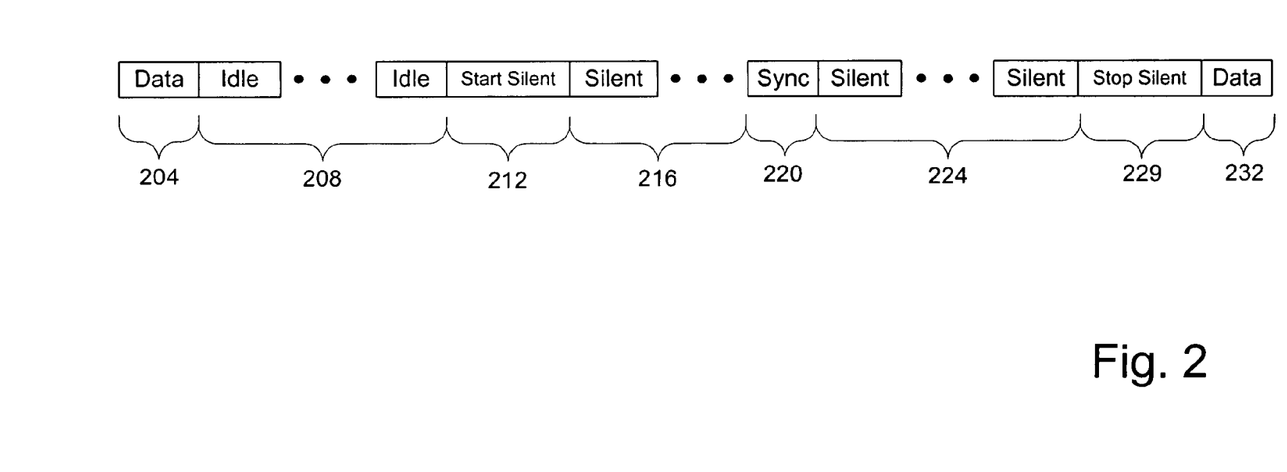
FIG. 2 illustrates a frame stream in accord with one embodiment of the present invention.

In one embodiment, during periods of reduced traffic, the transmitter, receiver, and received signal processing elements may be powered down or power down for time frames during the idle periods. These periods may be referred to herein as silent periods. FIG. 2 illustrates a frame stream in accord with one embodiment of the present invention. As shown, frame sequence 204 comprises data frames as discussed above. Thereafter, at frame sequence 208, the data is complete and the system enters an idle state. During this idle state, idle frames are transmitted. Any number of idle frames may be transmitted, but after a predetermined number of frames, the system may be configured to transmit a start silent frame during frame sequence 212. The silent start frame comprises a frame containing a code that initiates the silent period. Alternatively, the silent period may start automatically after the predetermined number of idle frames.

During the silent frame sequence 216 the system may enter a sleep or power down mode. It is contemplated that numerous different levels of operational reduction may occur. This may include shutting certain select systems down, slowing operation, or initiating periodic operation.

Next, during frame sequence 220, the operation may send a sync frame between the transmitter and the receiver. The sync frame as shown in sequence 220 may comprise one frame or any number of frames. It is contemplated that the sync frame may be sent at a predetermined time which is commonly known by the transmitter and the receiver and referred to herein as a sync frame time. It is also contemplated that an idle frame may be sent instead of the sync frame. Upon receipt of a sync frame, the receiver may perform processing to maintain the clock synchronization, timing, and perform adaptation to adjust equalizer and canceler coefficients. The sync frame could also be a wake-up code frame to restore active communication.

Thereafter, in FIG. 2, the frame sequence 224 contains further silent frames. During this period, the system is still not in use and as such, it continues in silent mode by not transmitting frames. Power consumption is reduced. At frame sequence 228, which may comprise a single frame or multiple frames, a stop silent frame is transmitted. The stop silent frame comprises a frame containing a code that is transmitted to the receiver and indicates to the receiver that active data communication is requested. It is thus contemplated that the receiver may monitor for an incoming frame and upon detection of an incoming frame, such as the stop silent frame sequence, then the receiver may resume active communication.

Alternatively, the system, namely transmitter/receiver pair, may be configured to await the next sync frame 220 to restore active communication. Thus, in this configuration, the receiver and transmitter can only resume active communication at one of the predetermined times.

Thereafter, at frame sequence 232 active communication resumes. In one embodiment, it is contemplated that data may be contained in the sync or idle frames. This allows for a slow rate data exchange, but still maintains the power saving benefits. This may be beneficial when only a low data rate is required or only a small amount of data need be periodically sent. Thus, data could be transferred for M 'on frames' for every N 'off frames'. Overhead and housekeeping data, such as timing information or precoder coefficients could also be sent. In either situation, the timing lock and frame sync may be maintained. And a wake cycle to refresh DSP coefficients is not necessary.

In one example embodiment, during idle mode, instead of continually transmitting, receiving, and processing idle frames, which consumes substantial power, the system enters power save mode and only transmits idle or sync frames every M out of X frames and is silent, i.e. powered down to some extent, N out of the X frames. M plus N equal X and the value of N is contemplated as being greater than the value of M. The values M, N, and X may be any positive whole number.

By way of example, during a 10 frame window during idle mode (power save mode), one (N) idle symbol frame may be sent and the system will be silent (powered down) for the remaining 9 (M) frames. As a result, notwithstanding leakage current, for the components that are powered down there is a 90% power savings. In addition, the transmit processing and receive processing are also the most power intensive aspects of the communication system. Even though other aspects of the transceiver may remain active and powered up, by substantially reducing the power consumption of these aspects, overall power consumption is greatly reduced. It is also contemplated that leakage current may be reduced or eliminated by gating off power connections to one or more devices.

For communication systems that remain idle for long periods, such as when the user is on the phone, away at lunch, in meetings, and at night, the power savings can be substantial. The power savings are further increased if the ratio of idle frames to silent frames is increased, such as 100 to 1 or 1000 to 1. Based on testing and estimation, the time between transmission of an idle frame during idle silent periods can be up to minutes. It is contemplated that the period between transmission of an idle or sync frame during a silent period could be any ratio or time depending on network and communication usage, priority, and desired power saving, keeping as an outer time limit a time which maintains system timing, synchronization, and adaptation.

One factor which may determine the ratio of silent periods to idle frame transmit periods, i.e. time periods between transmission of frame(s) containing idle frames, is the rate of change of the channel in terms of the channel echo and crosstalk signature. It is contemplated that adaptation of one or more filters within the communication system may be sufficiently maintained by the exchange of the idle symbols during transmit frames even though the transmit frames may be spaced between significant periods of silent frame, i.e. time periods when the system is silent and powered down to some extent. In such an embodiment, seconds or minutes may pass between transmission of the idle symbols and adaptation will occur based on analysis of the idle symbol during the transmit frame sufficient to maintain the communication link and the optimal (full rate) transmit rate. Due to the short duration in which sufficient synchronization and adaptation may occur, only a few sync or idle frames need be transmitted to maintain the transceiver.

During such idle states, it is contemplated that the timing circuit may be maintained in an active state, to maintain synchronization, but the clock to the echo and NEXT cancelers may be disabled. Other components of the system may be enabled and disabled as desired. As can be appreciated in CMOS applications, eliminating the clock eliminates the power draw, except for leakage current.

As a result of the sufficient adaptation during the transmit frame during idle state and maintaining the timing circuit active during idle state, the communication system may rapidly reactivate and enter full rate communication with minimal latency. For example, in contrast to other proposed power reduction schemes, which may take in the milliseconds or more to restart to full rate mode, the method and apparatus for power reduction disclosed herein is able wake to full rate communications in within microseconds or less. Recovery time may depend on the number of silent frames in relation to the number of idle symbol transmit frames. For example, a high performance network or user may recover faster as based on administrator settings which set a fewer number of silent frames between transmit frames. A standard or low level network or user may increase the number of silent frames between idle symbols (transmit frames). Power savings vary accordingly. The settings may be established by a network administrator and be based on user, network link, network, time of day, date, or type of frame or activity.

In addition, even during idle periods, when a user is not demanding data exchange, a physical change in the echo and crosstalk signature which is sufficient to require significant adaptation or retraining, can be detected upon reception of a transmit frame, containing an idle symbol(s) and the significant adaptation or retraining may occur before a user even requires full rate data exchange. If a need for retraining is detected, additional symbols may be sent to achieve such retrain. Thereafter, the system may return to idle mode. As a result, even a physical change to channel or surrounding channels may be detected and adapted to before a user requires full rate data exchange. This is true because it is unlikely the physical change (or any significant change requiring a full retrain) to the channel will occur at the generally same exact time that a user initiates a return to active mode.

It is further contemplated that there may be different levels of idle or power saving states. In one such state, the clock may be disabled from select components. In another state, all power is cut to select components, which will eliminate power consumption from leakage current.

Figure 3:
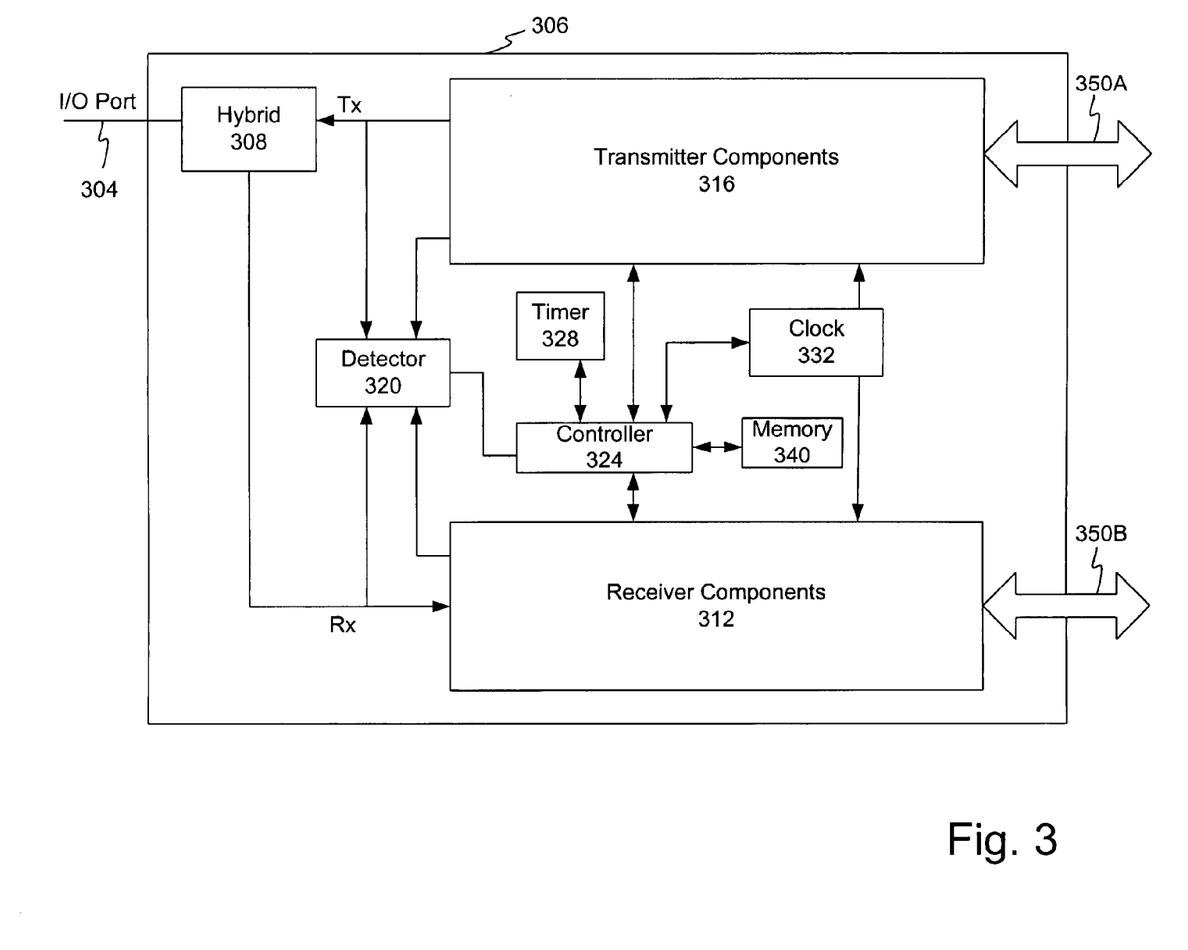
FIG. 3 illustrates a block diagram of an example embodiment of the present invention.

FIG. 3 illustrates a block diagram of an example embodiment of the present invention. This is but one example embodiment of a power saving transceiver and as such, it is contemplated that other embodiments may be created which do not depart from the claims that follow. In this example embodiment an input/output (I/O) port 304 provides a signal to a transceiver 306. Receiving the signal inside the transceiver 306 is a hybrid 308, which is known by those of skill in the art as a signal splitter. The I/O port 304 may comprise any type input and have any type connector or number of channels. In one embodiment, the input comprises one or more twisted pair conductor. The hybrid 308 connects to a transmitter 316 and receiver as shown and as is understood in the art. The hybrid 308 has an output that connects to the receiver 312. The receiver 312 includes apparatus that process incoming signal to establish the signal for use by higher level applications. The hybrid 308 receives an input from the transmitter 316 as shown. The transmitter 316 includes apparatus that process incoming signals from higher level application to establish signal for transmission over a channel. These elements are not shown in detail in this example block diagram. In one embodiment the receiver and transmitter operation is according to Ethernet protocol.

In one embodiment the receiver and transmitter operate at 10 Gbits per second. The transmitter 316 and receiver 312 connect to the upper level application layers via input/output ports 350A, 350B.

A detector 320 connects to and monitors the transmit and receive paths as shown. The detector may comprise any hardware, software, or combination thereof, configured to detect frames or communication on the monitored paths. The detector 320 may also connect directly to the receiver and/or transmitter as shown to thereby access the internal components of the receiver and transmitter.

Connecting to the detector 320 is a controller 324. The controller 324 may comprise any controller or processor capable of monitoring for idle symbols, causing the communication system to enter a silent period, and thereafter, restoring active data communication.

The controller 324 also connects to a counter or timer 328, a clock 332, and a memory 340. It is contemplated that the controller 324 may connect to or communication with additional components in the transmitter 316 and receiver 312. In this example embodiment the counter or timer 328 is configured to determine when to enter silent power save mode, and determine when to synchronize and adapt during silent power save mode. It is also contemplated that instead of a timer or counter, a clock signal may be used. The memory 340 may store machine readable code for use by the processor or controller 324. The memory may also store operation parameters including, but not limited to time before entry into power saving mode, the sync and adaptation schedule, such as how often to sync or adapt during silent periods, and how long to signal before resuming operation or any other operation parameter. The clock 332 may comprise a common clock shared by the transmitter 316 and the receiver 312. In one embodiment, the controller 324 may shut down the clock, or switch the clock away from the transceiver components as part of the silent power save mode.

In operation, the transmitter 316 transmits data over the channel. The receiver 312 may be receiving data during transmission depending on various factors. During operation, the system may enter an idle state, wherein a user or machine is not transmitting active data over the I/O port 304. At such time, the transmitter 316 will enter an idle state and begin transmitting idle frames. Concurrently the timer 328 and controller 324 may communicate to initiate a timer running. Alternatively, the controller 324 may count or track the number of idle frames sent over the channel. When a predetermined amount of time has passed while transmitting only idle frames or a predetermined number of idle frames have been sent, then the controller initiates a power down operation to reduce power consumption during periods of non-use. In one embodiment, this comprises powering down the transmitter. In one embodiment, this comprises powering down the transmitter and receiver. In one embodiment, this comprises powering down the clock or switching the clock away from the transmitter and/or receiver. In one embodiment, this comprises removing bias from the transmitter and/or receiver.

Upon entering power down mode, the transmitter 316 stops transmitting frames for a predetermined time period or frame period. Consequently, it is contemplated that the receiver processing at the opposing transceiver may likewise be synchronized and placed in reduced power consumption mode. This state may be considered a silent state and may last for any predetermined period of time.

At the start of the silent state, the timer 328 or other counting element may monitor the time from the start of the silent period. After a predetermined amount of time, the controller 324 will cause the transmitter to generate and send a sync frame or an idle frame. Upon receipt, the opposing receiver can process this known sync frame or an idle frame to maintain and update the receiver settings. For example, it is contemplated that timing and clock synchronization may occur as well as adaptation for changing channel conditions.

This pattern may continue wherein the system does not transmit idle frames when in power savings mode but will periodically, at a time known to both the transmitter and receiver, send and process sync or idle frames. These sync or idle frames are processed so that when active data communication is restored, the system may quickly restore communication without having to undergo a full retrain sequence.

Active data communication may be restored in two different ways. In one embodiment, the restoration of active data communication can only occur at the predetermined time for a sync or idle frame when in silent mode. In such an embodiment, the sync or idle frame may be supplemented or replaced with a restart code frame that signals the opposing receiver to restore active data communication.

Alternatively, the detector 320 may monitor the transmit path or receive path as shown in FIG. 3 for incoming idle or other type frames during a silent period. If idle or other type frames are detected then the detector 320 may signal the controller 324 to restore active data communication. This may occur by reversing the steps taken to enter power saving mode. In either embodiment, an acknowledgement may be sent from the opposing transceiver that the request to restore active communication has been received and acknowledged.

It is also contemplated that the predetermined time period between syncing or adaptation when in silent mode may be set by the user or the communication system controller 324. In such an embodiment, the channel characteristics and rate of change may be monitored. If the channel conditions are subject to change, then the sync frame and adaptation may occur more frequently.

In the case of Ethernet, 10 GBASE-T type Ethernet utilizes a fixed-length LDPC PHY frame, which may be referred to as set framing. This set framing interval may be utilized to signal reduced frame speed. As such, the receiver can alternate between 'off' or silent frames without burning signal processing decoding power. In addition, near and far end frames can be staggered for additional savings when frames are received. Stated another way, opposing transceivers may alternate the time at which they send sync frames. In this manner, it is contemplated that returning to high rate active data communication may occur within a single frame. Likewise, other PHYs can be structured similarly using period sync or idle symbols and their PCS's.

Figure 4:
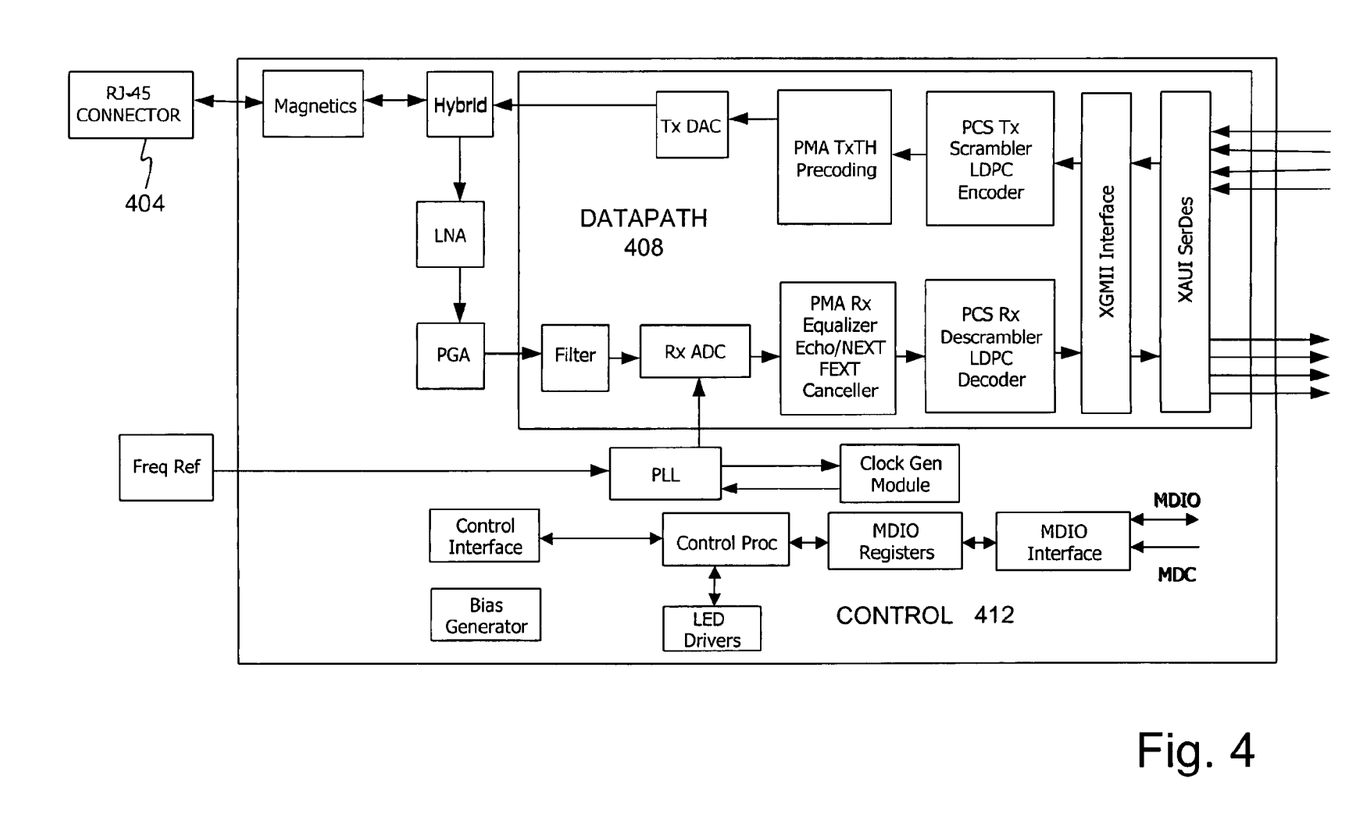
FIG. 4 illustrates a detailed block diagram of an example embodiment of a transceiver in an on state.

FIG. 4 illustrates an example communication system receiver, such as may be implemented in an Ethernet communication system in an on or active state. In this embodiment, communication channel (not shown) connects to a connector 404. The signal passes through the connector to a data path 408 where processing of the signal may occur to recover the data. Echo cancellation and crosstalk cancellation may occur within the data path 408. Each element is descriptively labeled within FIG. 4 and as such, each element is not discussed in detail herein beyond that described above and below. A control section 412 generates a clock signal and maintains synchronization of the receiver based on a reference frequency. The data path 408 receives the clock signal from the control section 412. During active data exchange operation occurs in the system of FIG. 4 as is understood in the art. Also included in this embodiment is one or more control elements configured to monitor for idle periods and enter/exit idle state as described herein. This may be enabled in hardware, software, or a combination of both.

In this example embodiment, the transceiver is shown in an on state and it is contemplated that in this on state, all of the elements shown in FIG. 4 are on, powered up, and active. This state would be considered a prior art power consumption state since all elements are active.

Figure 5:
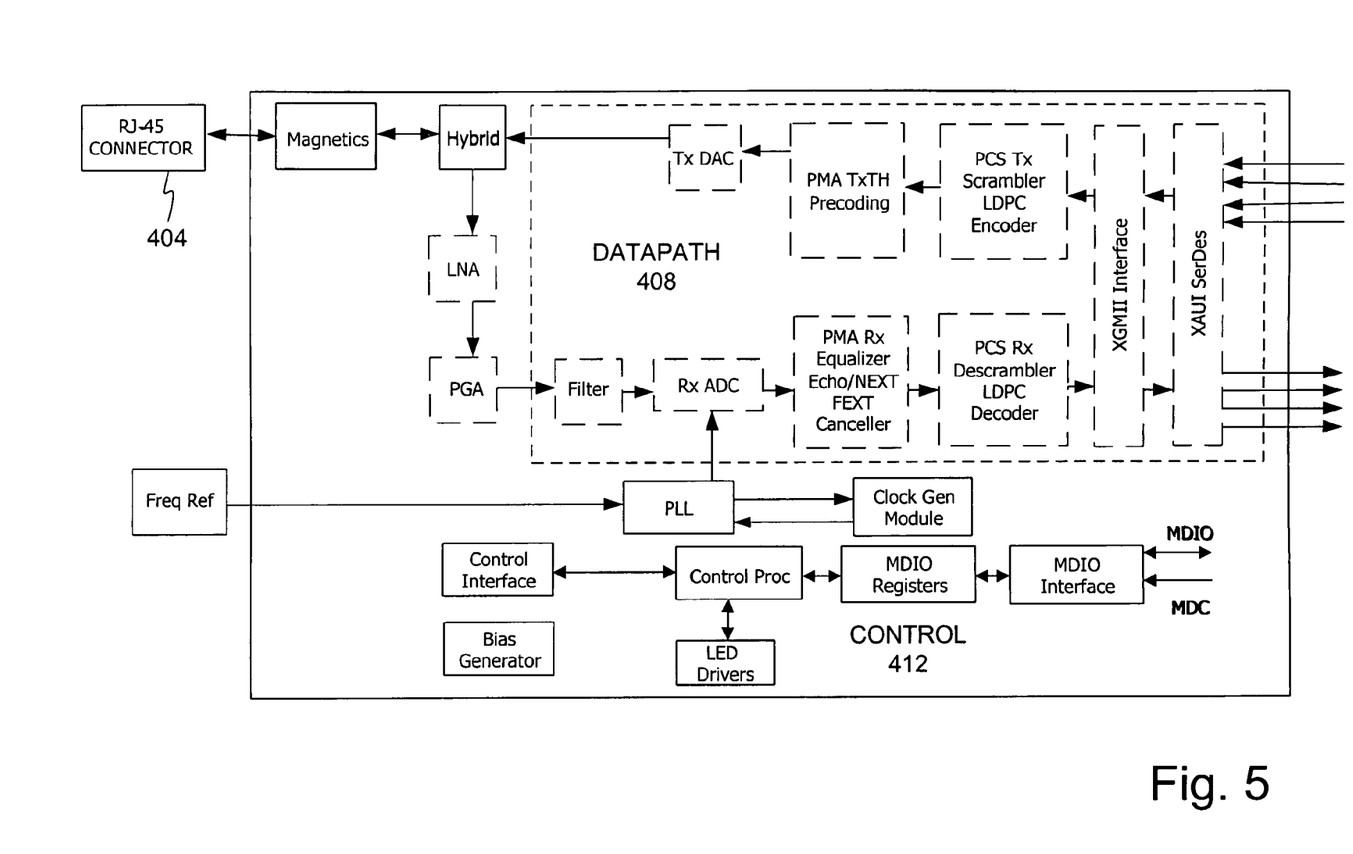
FIG. 5 illustrates a detailed block diagram of an example embodiment of a transceiver in a power save state.

FIG. 5 illustrates a detailed block diagram of an example embodiment of a transceiver in a power save state such that the elements of the data path of powered down. Powering down these elements may occur in any manner known now or in the future. In one embodiment, the elements are powered down by switching out the clock signal to these elements which substantially reduces power consumption. In a second embodiment, the elements are powered down or have the clocks or supply voltages switched or gates. This may eliminate leakage power consumption as well, at the cost of slightly longer recovery time. In one embodiment of the power save state, the block elements shown in dashed lines may be powered down during power save state. This saves substantial amounts of power and reduces heat generation. In one embodiment, the PCS and PMA synchronization is maintained. This enables blinder return to active data communication at a high rate. This method and apparatus also overcomes the drawback with simply reducing data transmit rate. In particular, because different data rates utilize different PCS elements, restoring status to a higher rate requires a time consuming re-activation of the higher rate PCS. Thus, when transitioning up from one data rate to a higher rate, the high rate PCS would have to be activated, which takes longer than the method and apparatus proposed herein.

Figure 6:
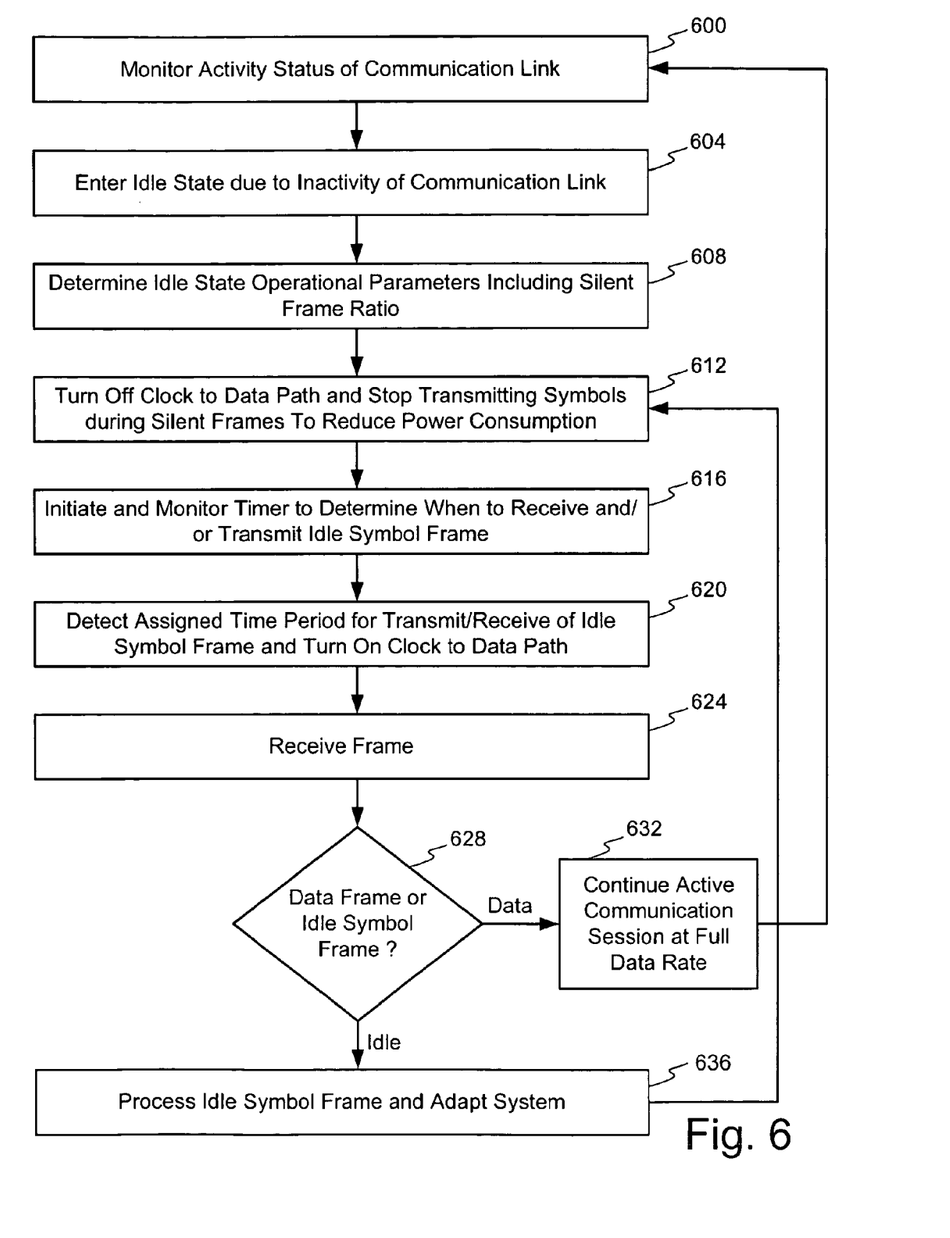
FIG. 6 illustrates an operation flow diagram of an example method of idle state transition and operation.

FIG. 6 illustrates an operation flow diagram of an example method of transition into and out of power save state. At a step 600 the system monitors the activity status of the communication link. The monitoring occurs to determine if the link is active, such as exchanging data, or idle and simply consuming valuable power transmitting, receiving and processing idle symbols. After a set time period of exchanging idle symbols the system will enter idle state, which may also be referred to herein as power save state. This occurs at step 604. The amount of time may be established by the manufacture, network installer, or network administrator.

At a step 608, the system determines the idle state operational parameters. The idle state parameters may include the degree to which systems are modified or shut down to reduce power consumption. For example, there may be varying levels of power consumption which correspond to different changes to the communication system. In one embodiment, the clock to the data processing path is switched off. In addition, the idle state parameters may include the time between transmission of idle frames and silent frames during idle state. This may be referred to as the silent frame ratio.

At a step 612, the system turns off the clock to the data path and stops transmitting and idle symbols. The transmitter may go silent for any number of silent frames depending on the silent frame ratio. This reduces power consumption. The timing functions of the receiver/transmitter may remain on to maintain synchronization. At a step 616, the system initiates a timer or other monitoring system to determine when to receive and/or transmit one or more idle symbol frames(s). In one embodiment, the system performs time synchronized monitoring to determine when to send a silent frame. In one embodiment, a predetermined number of silent frames may be sent before a transmit frame occurs.

Then, at a step 620, the system detects or determines the assigned time period (or frame number) for transmission/reception of an idle symbol and turns on the clock to the data path. In other embodiments, other events may occur to activate the receiver/transmitter system. Then, at step 624, the communication system receives a frame. It is contemplated that at this stage, the frame may be analyzed to determine if the frame is data or idle symbols. This occurs at decision step 628. If at decision step 628 a data frame is detected, then the operation advances to step 632, wherein the communication system is restarted or is maintained in active mode and continues communication at full rate. Thereafter, the operation returns to step 600. After active communication, the system may return to power save mode as described above.

Alternatively, if at decision step 628 the system detects an idle symbol, then the system may stay in power save mode. The operation advances to step 636 to process the idle frame to maintain system synchronization and adapt to any changes in channel condition. By processing the idle symbols, which are periodically received, the communication system is capable of returning to full rate communication at any time with minimal delay.

The method and apparatus disclosed herein overcomes the challenges of how to transition rapidly from power save state to active data communication. By sending a sync or idle symbol for synchronization and adaptation periodically during silent mode, the settings of the transceivers may be maintained current. Restoring active data communication may occur quickly. It is contemplated that with this method and apparatus autonegotiation can be bypassed. In one embodiment, transition time of 1 microsecond may be possible.

The following definitions relate to the abbreviations utilized in the slides, which are part of this provisional application.

PHYs—Physical layer transceiver devices

10 GBASE-T—10 gigabit Ethernet transceiver designed to run on twisted-pair copper media PCS—Physical Coding Sublayer—a sublayer of a PHY that defines how bits are encoded and grouped for transmission, and decoded on reception.

PMA—Physical Media Adaptation (sublayer)—a sublayer of a PHY that defines how encoded and grouped bits are mapped to electrical signals for transmission and received/demapped on reception. This sublayer is also responsible for any signal processing and conditioning necessary for reception.

LDPC—Low Density Parity Check code. LDPC codes are powerful forward error correction codes used in the 10 GBASE-T PCS.

DSP—Digital Signal Processor (a way of implementing the PMA) Acronyms in the block diagram:

DAC—Digital to analog converter

TxTH Precoder—Transmitter Tomlinson-Harashima Precoder—a signal conditioning device used to provide high-performance equalization for coded systems.

XGMII Interface—The 10(X) Gigabit Media Independent Interface. A PHY-neutral interface defined by IEEE Std. 802.3-2005 between the MAC and PHY layers. The XGMII interface is highly parallel (32 bits wide), hence the use of the XAUI interface externally.

XAUI—The 10(X) Gigabit Attachment Unit Interface SERializer/DESerializer. A 4-lane serial interface (and its associated serializer/deserializer hardware) defined to efficiently transmit 10 Gigabit Ethernet interfaces across printed circuit board traces.

LNA—vLow Noise Amplifier—used in the receiver front end to amplify the weak received signal without adding excess noise.

PGA—Programmable Gain Amplifier—used to adjust the level of the receive signal.

RxADC—Receiver Analog to Digital Converter—converts the received signal to digital words for digital signal processing.

PLL—Phase Locked Loop—a device used for timing recovery and clock generation.

MDIO—Management Data Input/Output—an interface defined by 802.3-2005 used to access management registers in an Ethernet device.

The principles discussed herein may apply to any other type communication system, including but not limited to 10 GBASE-T, 1000 BASE-T, and 100 BASE-T. Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A first transceiver operable to establish a first connection with a second transceiver over a channel, the first transceiver comprising:
   a receiver configured to
   maintain communication parameters for the first connection with the second transceiver, and process signals received over the channel according to the communication parameters;
   monitor for idle frames from the second transceiver, and begin running of a first idle period in response to receiving a predetermined number of consecutive idle frames, wherein the predetermined number of consecutive idle frames is greater than one, wherein the first idle period has a first predetermined length, wherein the first predetermined length is known a priori to both the receiver and the second transceiver, and wherein a communications protocol defines a format for the idle frames and specifies that the idle frames be transmitted in the absence of data frames being available for transmission;
   during the first idle period, suspend adaptation of the communication parameters for the first connection with the second transceiver;
   at an end of the first idle period, (i) receive a first frame from the second transceiver, (ii) determine present conditions of the channel based on the first frame, and (iii) in response to a comparison between the present channel conditions and prior channel conditions exceeding a predetermined threshold, selectively adapt the communication parameters for the first connection with the second transceiver based on the present channel conditions; and
   selectively begin running of a second idle period based on idle frames received subsequent to the end of the first idle period; and
   a transmitter configured to suspend transmitting frames to the second transceiver during the first idle period and the second idle period.

2. The first transceiver of claim 1, wherein the communication parameters include at least one of equalizer coefficients, echo canceler coefficients, and crosstalk canceler coefficients.

3. The first transceiver of claim 1, wherein the transmitter is configured to, at the end of the first idle period, transmit a second frame to the second transceiver.

4. The first transceiver of claim 3, wherein the second frame is one of an idle frame, a training frame, and a sync frame.

5. The first transceiver of claim 1, further comprising a timer configured to:
   track the running of the first idle period and notify the receiver of the end of the first idle period; and
   track the running of the second idle period.

6. The first transceiver of claim 1, wherein the idle frames do not contain user data.

7. The first transceiver of claim 1, wherein the receiver is configured to begin the running of the second idle period in response to the first frame lacking an indication that active data communication is requested, and wherein the second idle period has the first predetermined length.

8. The first transceiver of claim 1, further comprising:
   a crosstalk canceler;
   an echo canceler; and
   a timing circuit,
   wherein during the first idle period, clock signals to the crosstalk canceler and the echo canceler are disabled while leaving the timing circuit in an active state.

9. The first transceiver of claim 1, wherein the first transceiver is otherwise compliant with IEEE Standard 802.3-2005.

10. A communications device comprising:
    the first transceiver of claim 1; and
    a controller configured to control the transmitter and the receiver.

11. The communications device of claim 10, wherein the communication device comprises a 10 G-BaseT communication system.

12. A method of operating a first transceiver, the first transceiver operable to establish a first connection with a second transceiver over a channel, the method comprising:
    maintaining communication parameters for the first connection with the second transceiver;
    processing signals received over the channel according to the communication parameters;
    monitoring for idle frames from the second transceiver;
    beginning running of a first idle period in response to receiving a predetermined number of consecutive idle frames, wherein the predetermined number of consecutive idle frames is greater than one, and wherein the first idle period has a first predetermined length, wherein the first predetermined length is known a priori to both the first transceiver and the second transceiver, and wherein a communications protocol defines a format for the idle frames and specifies that the idle frames be transmitted in the absence of data frames being available for transmission;
    during the first idle period, suspending adaptation of the communication parameters for the first connection with the second transceiver;

upon an end of the first idle period, (i) receiving a first frame from the second transceiver, (ii) determining present conditions of the channel based on the first frame, (iii) in response to a comparison between the present channel conditions and prior channel conditions exceeding a predetermined threshold, selectively adapting the communication parameters for the first connection with the second transceiver based on the present channel conditions, and (iv) selectively beginning running of a second idle period based on idle frames received subsequent to the end of the first idle period; and suspending transmitting frames to the second transceiver during the first idle period and the second idle period.

13. The method of claim 12, wherein the communication parameters include at least one of equalizer coefficients, echo canceler coefficients, and crosstalk canceler coefficients.

14. The method of claim 12, further comprising, at the end of the first idle period, transmitting a second frame to the second transceiver.

15. The method of claim 14, wherein the second frame is one of an idle frame, a training frame, and a sync frame.

16. The method of claim 12, further comprising using a timer to (i) track the running of the first idle period, (ii) generate a notification of the end of the first idle period, and (iii) track the running of the second idle period.

17. The method of claim 12, wherein the idle frames do not contain user data.

18. The method of claim 12, wherein the beginning the running of the second idle period is performed in response to the first frame lacking an indication that active data communication is requested, and wherein the second idle period has the first predetermined length.

19. The method of claim 12, wherein the method is otherwise compliant with IEEE Standard 802.3-2005.

* * * * *